MECHANICS OF A METHOD FOR THE INDUCING AND RECORDING THE PHENOMENA KNOWN AS NYSTAGMUS, CAUSED BY STIMULATION OF EITHER OR BOTH LABYRINTHS, PORTIONS OF THE BALANCING MECHANISM OF THE HUMAN BODY

Filed Oct. 27, 1958 7 Sheets-Sheet 1

INVENTORS
SALMON C. HARVEY,
NICHOLAS LAGOUMINTZIS
& CARL C. HARVEY
BY Carl Miller
ATTORNEY MECHANICS OF A METHOD FOR THE INDUCING AND RECORDING THE PHENOMENA KNOWN AS NYSTAGMUS, CAUSED BY STIMULATION OF EITHER OR BOTH LABYRINTHS, PORTIONS OF THE BALANCING MECHANISM OF THE HUMAN BODY Filed Oct. 27, 1958 7 Sheets-Sheet 2

INVENTORS
SALMON C. HARVEY,
NICHOLAS LAGOUMINTZIS
BY & CARL C. HARVEY
Carl Miller
ATTORNEY Sept. 19, 1961 S. C. HARVEY ET AL 3,000,271

MECHANICS OF A METHOD FOR THE INDUCING AND RECORDING THE PHENOMENA KNOWN AS NYSTAGMUS, CAUSED BY STIMULATION OF EITHER OR BOTH LABYRINTHS, PORTIONS OF THE BALANCING MECHANISM OF THE HUMAN BODY

Filed Oct. 27, 1958 7 Sheets-Sheet 3

INVENTORS
SALMON C. HARVEY,
NICHOLAS LAGOUMINTZIS
& CARL C. HARVEY
BY Carl Miller
ATTORNEY MECHANICS OF A METHOD FOR THE INDUCING AND RECORDING THE PHENOMENA KNOWN AS NYSTAGMUS, CAUSED BY STIMULATION OF EITHER OR BOTH LABYRINTHS, PORTIONS OF THE BALANCING MECHANISM OF THE HUMAN BODY Filed Oct. 27, 1958 7 Sheets-Sheet 4

INVENTORS
SALMON C. HARVEY,
NICHOLAS LAGOUMINTZIS
BY & CARL C. HARVEY
Carl Miller
ATTORNEY MECHANICS OF A METHOD FOR THE INDUCING AND RECORDING THE PHENOMENA KNOWN AS NYSTAGMUS, CAUSED BY STIMULATION OF EITHER OR BOTH LABYRINTHS, PORTIONS OF THE BALANCING MECHANISM OF THE HUMAN BODY Filed Oct. 27, 1958 7 Sheets-Sheet 5

INVENTORS
SALMON C. HARVEY,
NICHOLAS LAGOUMINTZIS
& CARL C. HARVEY
BY Carl Miller
ATTORNEY MECHANICS OF A METHOD FOR THE INDUCING AND RECORDING THE PHENOMENA KNOWN AS NYSTAGMUS, CAUSED BY STIMULATION OF EITHER OR BOTH LABYRINTHS, PORTIONS OF THE BALANCING MECHANISM OF THE HUMAN BODY Filed Oct. 27, 1958 7 Sheets-Sheet 6

INVENTORS
SALMON C. HARVEY,
NICHOLAS LAGOUMINTZIS
& CARL C. HARVEY
BY Carl Miller
ATTORNEY Sept. 19, 1961 S. C. HARVEY ET AL 3,000,271

MECHANICS OF A METHOD FOR THE INDUCING AND RECORDING THE PHENOMENA KNOWN AS NYSTAGMUS, CAUSED BY STIMULATION OF EITHER OR BOTH LABYRINTHS, PORTIONS OF THE BALANCING MECHANISM OF THE HUMAN BODY

Filed Oct. 27, 1958 7 Sheets-Sheet 7

INVENTORS
SALMON C. HARVEY,
NICHOLAS LAGOUMINTZIS
& CARL C. HARVEY
BY Carl Miller
ATTORNEY United States Patent Office 3,000,271

Patented Sept. 19, 1961

3,000,271

MECHANICS OF A METHOD FOR THE INDUCING AND RECORDING THE PHENOMENA KNOWN AS NYSTAGMUS, CAUSED BY STIMULATION OF EITHER OR BOTH LABYRINTHS, PORTIONS OF THE BALANCING MECHANISM OF THE HUMAN BODY

Salmon C. Harvey, 7702 4th Ave., and Nicholas Lagoumintzis, % Brooklyn Eye & Ear Hospital, 29 Greene Ave., both of Brooklyn, N.Y., and Carl C. Harvey, % Sadie Horowitz, 585 Maple Ave., Teaneck, N.J.

Filed Oct. 27, 1958, Ser. No. 769,642
4 Claims. (Cl. 128—2.1)

This invention relates to measurement apparatus and more particularly to methods for inducing and recording the phenomena known as nystagmus in the human body.

Various methods have, in the past, been used to induce nystagmus in the human body, such as the Barany chair, the caloric method, and the electrical method. In each case, however, such prior art methods were defective either because of inaccurate measurements, varying conditions relating to different patients, and inaccurate measuring equipment. It is therefore an object of the present invention to provide a method and apparatus for inducing nystagmus by using a minimum stimulus to the labyrinth and to note the characteristics of this nystagmus in such a way that is extremely accurate, devoid of discomfort or pain to the patient, and which will overcome the aforementioned difficulties.

Another object of the present invention is to provide an apparatus and method for applying a stimulus to the labyrinth that is capable of precise measurement in either relative or absolute terms.

A further object of the present invention is to provide a method and apparatus of the type described that requires no surgical procedures for either the induction or recording nystagmus and which will in no way harm or cause the patient undue pain or discomfort.

A further object of the present invention is to provide a method and apparatus of inducing nystagmus that is equally as well applicable to all subjects, even those having damaged ear drums.

Still a further object of the present invention is to provide a method and apparatus of the type described which does not affect the mechanical characteristics of the eyeballs and their actuating muscles considered as an oscillating mechanical system.

All of the foregoing and still further objects and advantages of this invention will become apparent from a study of the following specification, taken in connection with the accompanying drawing, wherein.

Figure 1:
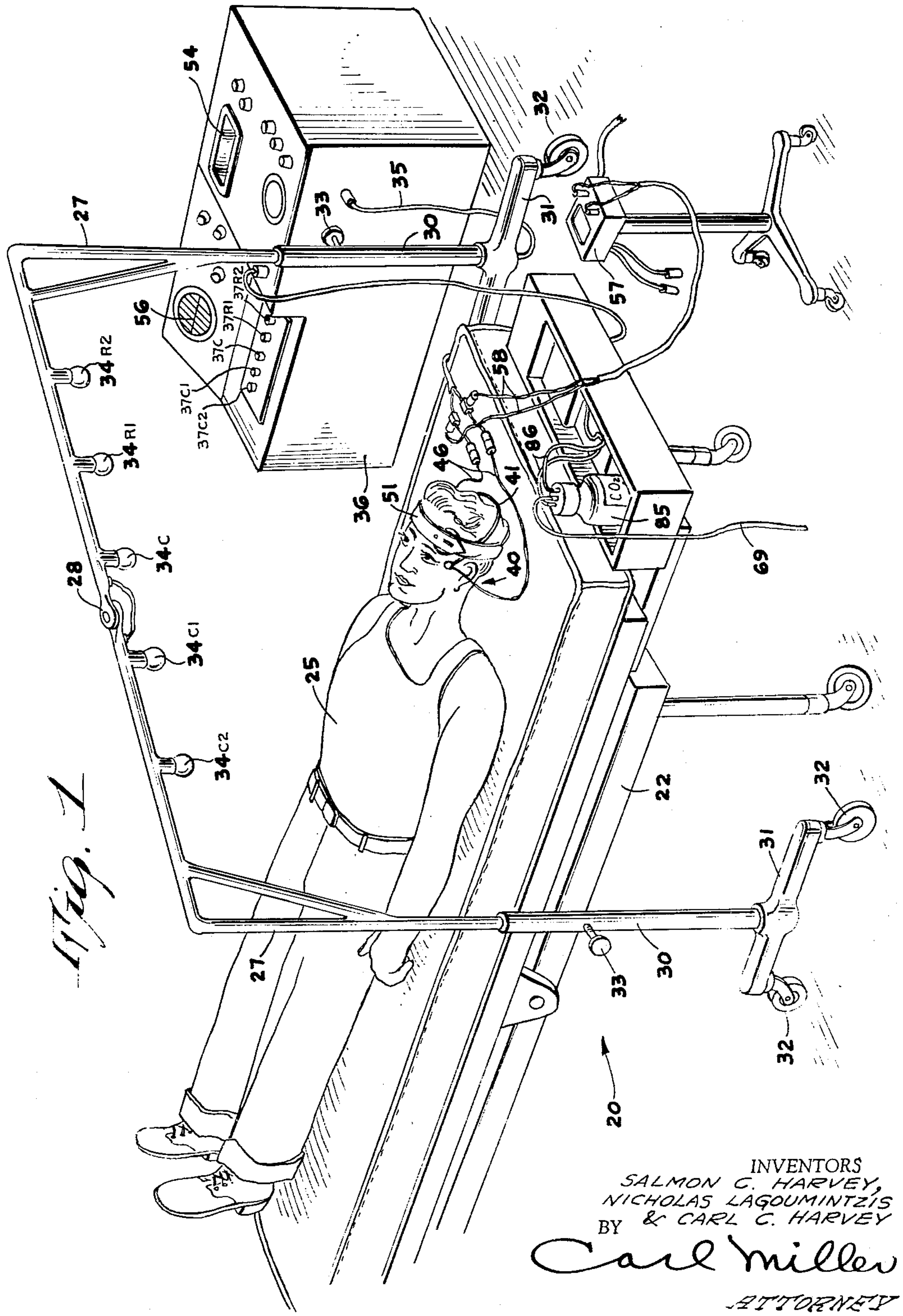
FIGURE 1 is a perspective view of apparatus made in accordance with the present invention in operative use.
Figures 2, 3:
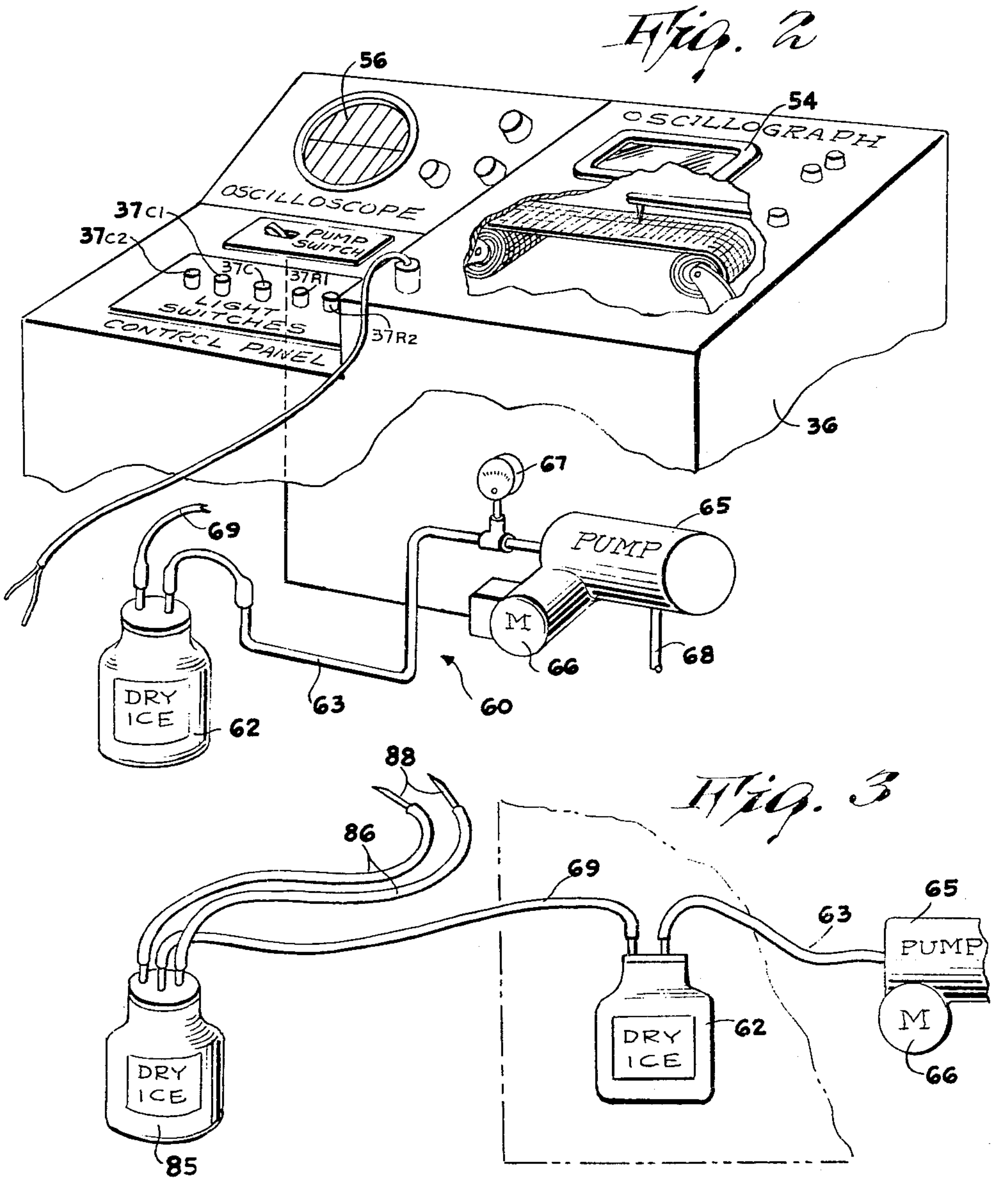
FIGURE 2 is a fragmentary perspective view of certain portions of the control apparatus.
FIGURE 3 is a diagram of a modified system for applying a stimulus to two ears simultaneously.
Figure 16:
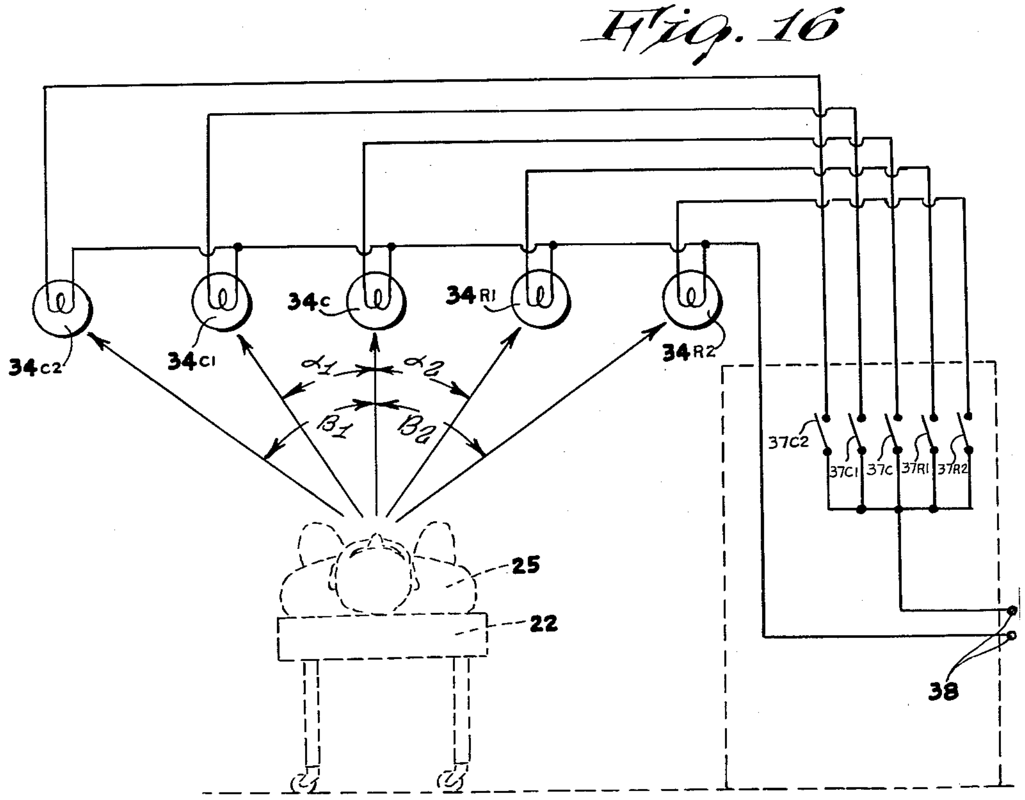
FIGURE 16 is a wiring diagram of certain lamps forming a part of the present invention.

Referring now to the drawing, and more particularly to FIGURE 1 thereof, apparatus 20 made in accordance with the present invention for inducing and recording nystagmus in a patient 25 is shown to include an adjustable tilt table 22 upon which the patient lies in a substantially prone position. However, props or cushions may be used to adjust the position of the patient's head, depending upon the condition of the patient, to obtain the desired measurements. A pair of L-shaped arms 27 are pivotally connected at one end by means of a pivot pin 28, while the opposite ends thereof are slidably received within sleeves 30 supported upon bases 31 that are carried by caster wheels 32. Stop screws 33 enable the height of the L-shaped arms 27 to be adjusted, while the caster wheels enable the unit to be oriented properly with respect to the position of the patient. A plurality of lamps $34_{C2}$, $34_{C1}$, $34_{C}$, $34_{R1}$, $34_{R2}$ are secured to the L-shaped arms in substantially aligned relationship, the center lamp $34_{C}$ lying directly above the eyes of the patient. These lamps are connected by means of an electrical supply line 35 to the control panel 36 that has a separate switch $37_{C2}$, $37_{C1}$, $37_{C}$, $37_{R1}$, $37_{R2}$, which control each of the individual lamps, respectively. As is shown in FIGURE 16, these lamps are all connected to a common source 38 for energization thereof.

Figure 4:
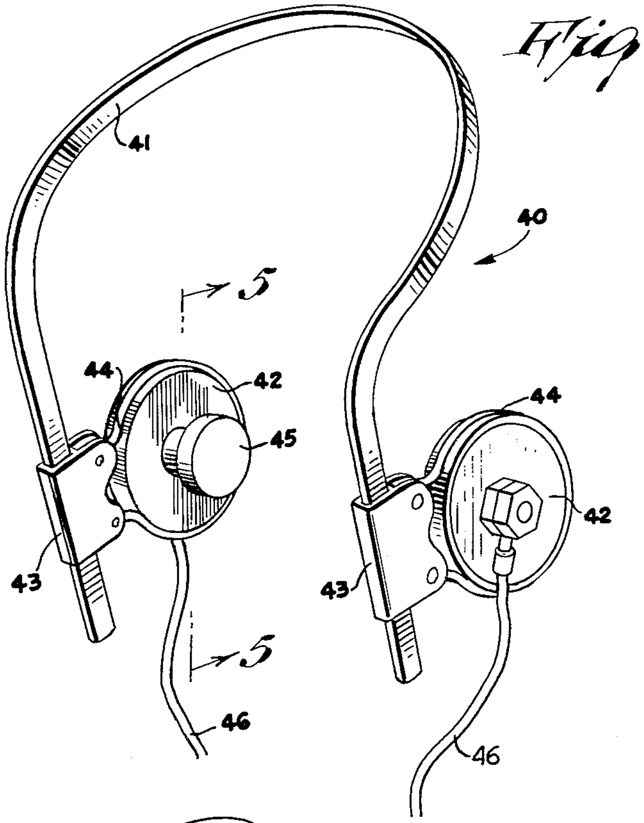
FIGURE 4 is a perspective view of a head set forming a part of the present invention.
Figure 5:
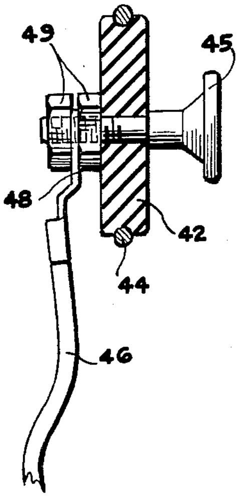
FIGURE 5 is a transverse cross sectional view taken along line 5—5 of FIGURE 4.
Figure 6:
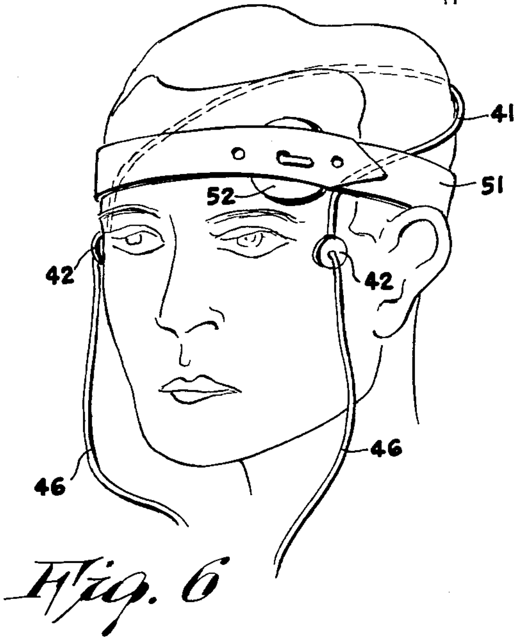
FIGURE 6 is a perspective view showing the head set illustrated in FIGURES 4 and 5 in operative use.
Figures 7, 8, 9, 10, 11:
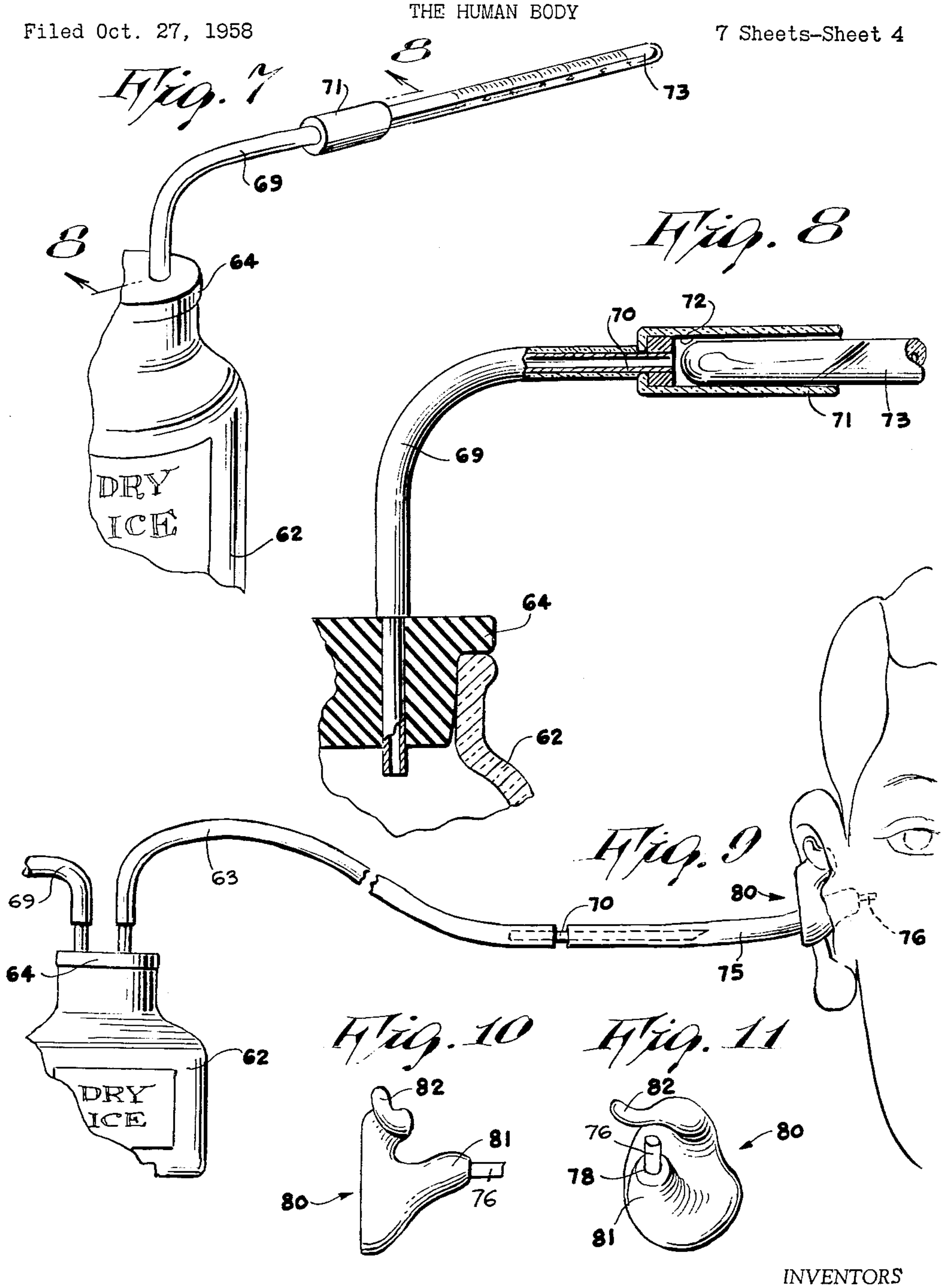
FIGURE 7 is a fragmentary view showing a thermometer being used to measure the temperature of a stimulus used in accordance with the present invention.
FIGURE 8 is an enlarged fragmentary transverse cross sectional view taken along line 8—8 of FIGURE 7.
FIGURE 9 is a side elevational view, with parts broken away, showing the manner in which the stimulus is applied to an ear.
FIGURE 10 is a side elevational view of an ear piece made in accordance with the present invention.
FIGURE 11 is a front view of the ear piece shown in FIGURE 10.

With reference now to FIGURES 4 to 6 of the drawing, a head piece 40 forming another part of the present invention is shown to include a yieldable frame 41 upon which brackets 43 are slidably and adjustably supported for securing mountings 42 thereto by means of frames 44. Each such mounting 42 includes an electrode 45 for contact with the temple of the patient, each such electrode 45 having an individual lead 46 that is connected to the terminal 48 at one end by means of nuts 49 and which is connected to measuring and recording apparatus at the opposite end in a manner hereinafter described. The head piece 40 also includes a securement strap 51 having a padded buckle 52 which secures the frame 41 in proper position upon the head so that the contacts 45 are in proper engagement with the temples of the patient.

The measuring and recording apparatus forming a part of the present invention includes a highly sensitive oscillograph 54 that has a two channel recording system, as well as an oscilloscope which provides a visual reading during the operation of the equipment. An ohm meter 57 that is used to test each patient is also provided with leads 58 that are connected across the leads of the contacts or electrodes 45 of the head piece.

With reference now to FIGURES 2, 3, and 7 to 11, apparatus 60 for providing the proper stimulus for inducing nystagmus is shown to include a vessel 62 having an air line 63 communicating with the interior thereof through a stopper 64. The opposite end of the air line 63 is connected to a pump 65 that is driven by a motor 66 at constant speed. The pressure produced by the pump is clearly readable upon a gauge 67 connected in the line 63. The pressurized air delivered to the interior of the vessel 62 which, preferably contains Dry Ice, causes the Dry Ice to sublimate, thus producing gaseous carbon dioxide which is at a lower temperature than the room temperature. This gas is then directed out of the interior of the vessel 62 through an insulated outlet line 69 having a fitting 70 at the outermost end. The temperature of the gas passing through this outlet line 69 may be conveniently measured by means of a thermometer 73 which can be inserted into the chamber 72 of a coupling member 71 which is releasably attached thereto. However, the temperature of the gas passing through the line 69 can be effectively controlled by the length of the tubing and the pressure of the air entering the vessel through the line 63. As a result, such gas may be passed into a resilient tube 75 connected to the fitting 70 for delivery to a small conduit 76 that is mounted within the bore 78 of an ear piece 80 forming another part of the present invention. This ear piece 80 has a bulbous portion 81 through which the conduit 76 extends into proximity with the ear drum of the patient, and an arcuate portion 82 which retains the ear piece within the ear in proper position. As will be hereinafter more fully explained, the supply of this gas to the ear drum at a lowered temperature is operative to induce nystagmus in the labyrinths of the patient's ear.

If desired, both ears may be simultaneously supplied with the stimulus by employing a second vessel 85 having a similar quantity of Dry Ice therein which is provided with two outlet lines 86 and individual fittings 88 for individual connection to separate flexible supply lines 75. In this arrangement, as is clearly shown in FIGURE 3, the outlet line 69 of the first vessel 62 is operative to supply partially cooled gas to the interior of the second vessel 85 so as to enable twice the amount of gas at the same temperature to be supplied to both ears at the same time.

Figure 12:
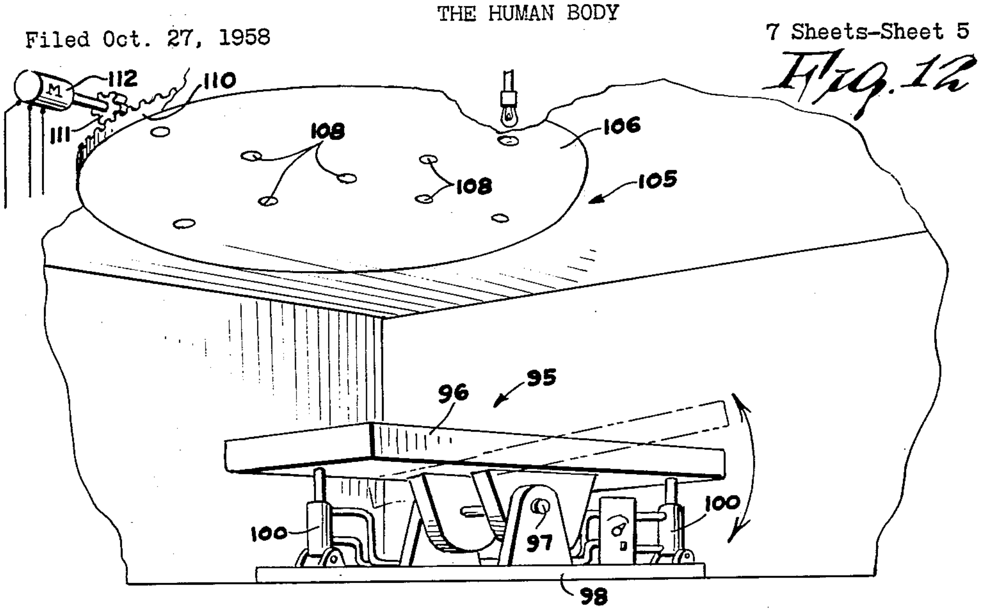
FIGURE 12 is a perspective view of a modified structure illustrating a hydraulically tilting table and lamp system for standardizing the patient.
Figure 13:
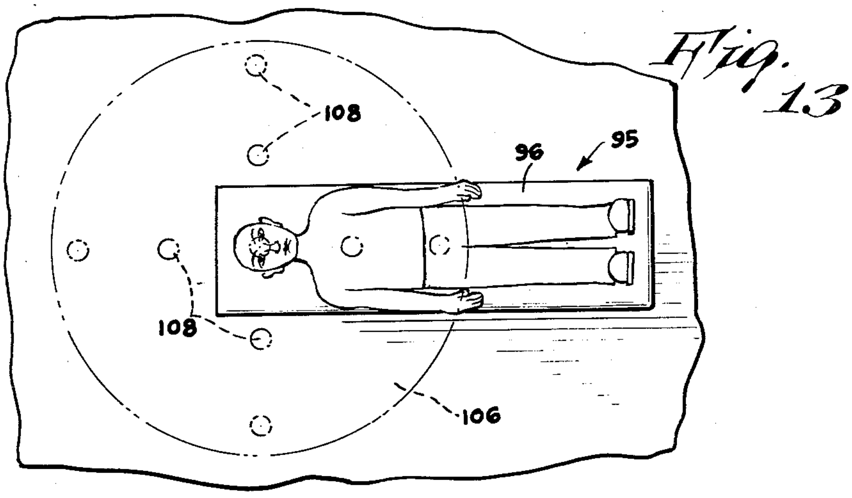
FIGURE 13 is a plan view of certain parts of the apparatus shown in FIGURE 12 in operative use.
Figure 14:
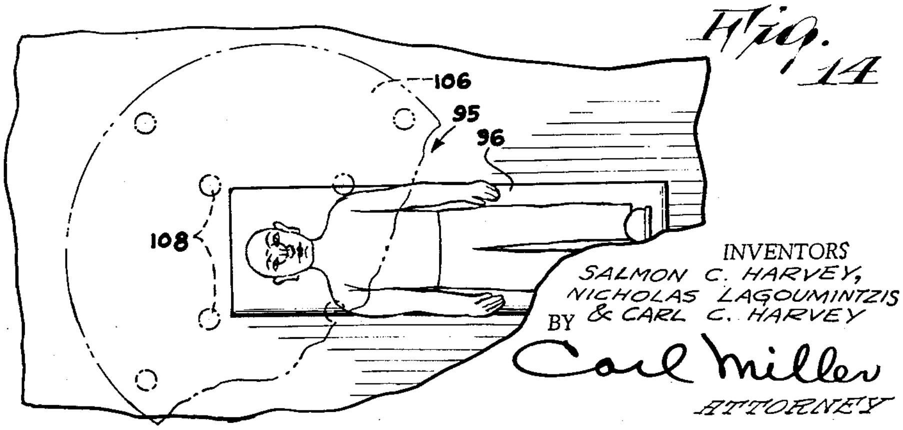
FIGURE 14 is a view similar to FIGURE 13 showing certain parts in an adjusted position.
Figure 15:
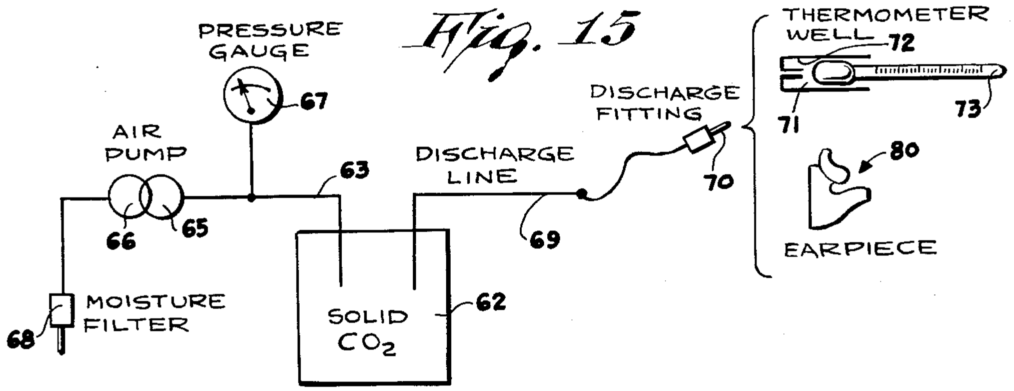
FIGURE 15 is a diagrammatic view of the apparatus used for applying a stimulus in accordance with the present invention.

Reference is now made to FIGURES 12 to 14 of the drawing which illustrates a modified form of table construction 95 that includes a top 96 mounted upon pivots 97 to a base 98. In this embodiment, however, hydraulic cylinders 100 serve to selectively tilt the table to any desired position to properly orientate the patient to be studied. This embodiment also includes a different type of lamp system 105 that includes a circular plate 106 having a pair of perpendicularly intersecting rows of lamps 108 which correspond to the vertical and horizontal axes of the labyrinths of the balancing mechanism of the patient's body. It is thus possible to standardize the patient in any desired direction merely by rotating the plate 106, in the manner illustrated in FIGURES 13 and 14, through a ring gear 110 integral therewith that is in meshing engagement with the drive pinion 111 of a motor 112.

Figure 19:
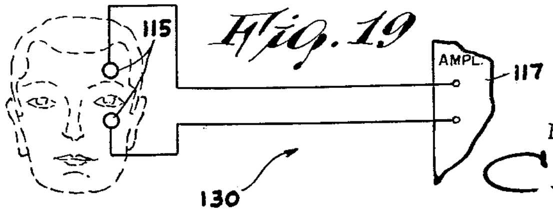
FIGURE 19 is a view similar to FIGURE 17, showing apparatus in use measuring only the vertical component of nystagmus.
Figures 17, 18:
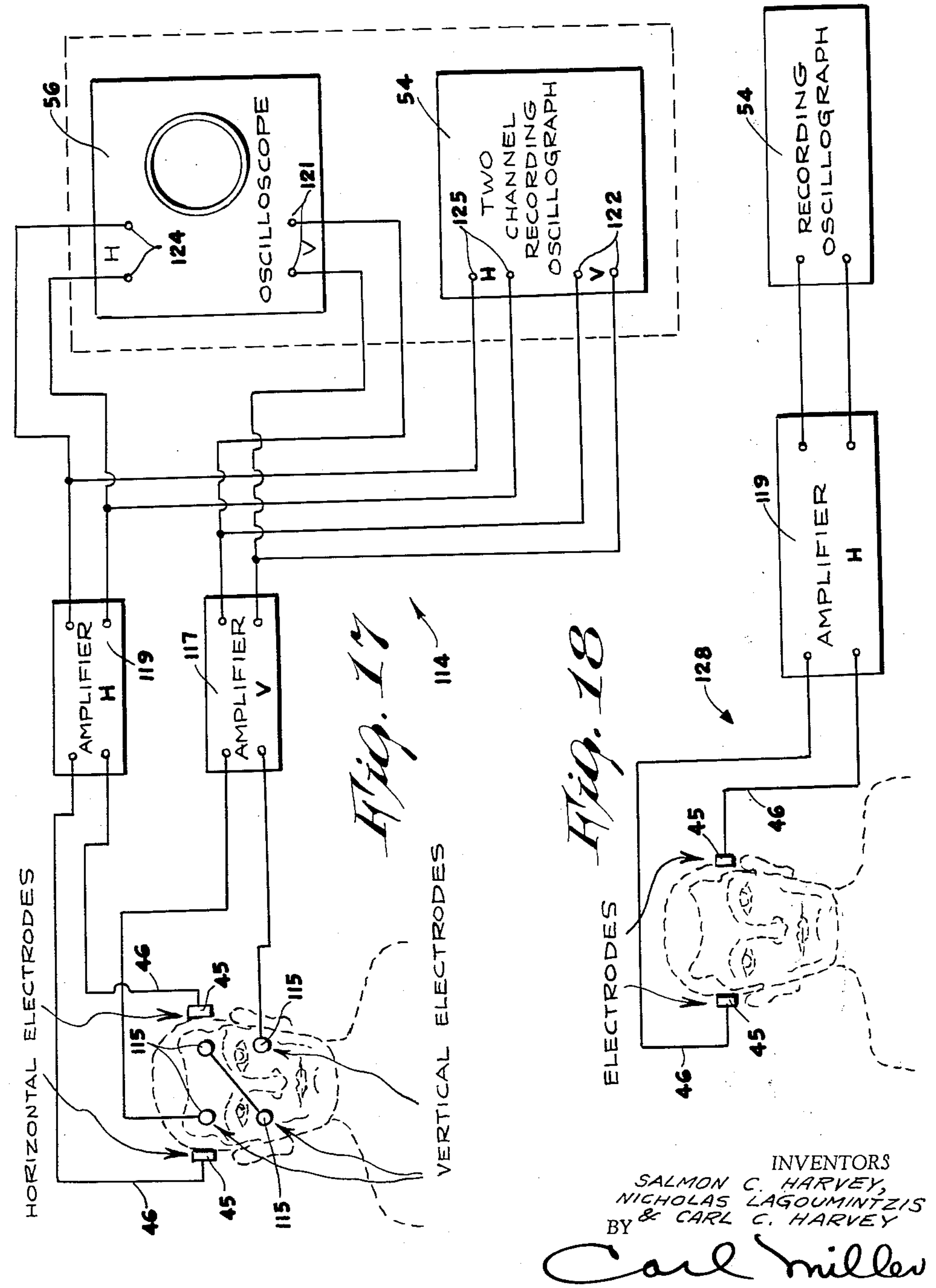
FIGURE 17 is a schematic wiring diagram of apparatus constructed in accordance with the present invention for measuring both horizontal and vertical components of nystagmus.
FIGURE 18 is a view similar to FIGURE 17, showing the apparatus in use measuring only the horizontal components of nystagmus.

The actual measuring apparatus is more clearly illustrated in FIGURES 16 to 19 which also include the wiring diagrams of the various components. In FIGURE 17, the equipment is applied to the patient to induce and record nystagmus in both the horizontal and vertical directions. As such, the system 114 includes vertical electrodes 115 in addition to the horizontal electrodes 45. While the horizontal electrodes are placed at each temple of the patient, the vertical electrodes are placed one above and one below each eye of the patient. The vertical electrodes 115 are connected to one amplifier 117, while the horizontal electrodes 45 are connected to another amplifier 119. The amplified signals are then transmitted to the vertical channels 121, 122 and horizontal channels 124, 125 of the oscilloscope 56 and oscillograph 54, respectively, whereby all the signals are permanently recorded and visually observable during the treatment. In FIGURE 18, the equipment 128 is shown to be set up for inducing and measuring nystagmus only in the horizontal direction, whereby only a single amplifier 119 and the recording oscillograph 54 are required. In FIGURE 19, the equipment 130 is shown to be set up for inducing and recording nystagmus in the vertical direction only such that only a single amplifier 117 is required.

It will now be recognized that the entire apparatus basically includes means in the form of a carbon dioxide chilled gas generator for stimulating the labyrinth of the balancing mechanism of the patient, means in the form of an adjustable table for orientating the head of the patient to control the stimulation of the proper labyrinths, standardizing apparatus in the form of the lamps for obtaining a normal reading of the patient's controllable eyeball movement to form a basis of comparing the recorded data during the nystagmus test, and recording means for recording signals produced by the electrical detection system which is responsive to changes in potential produced by the oscillating eyeballs of the patient.

In examining a patient, his temples are first cleaned with a solvent such as benzine or the like to de-grease the skin and an electrically conducting jelly is then applied to the proper areas to decrease the contact resistance as much as possible. The ear pieces are then inserted and the patient is placed prone upon the table directly beneath the lamps. The electrodes are then applied and the contact resistance checked with the ohm meter 57. The patient must then be examined against a given standard for the purpose of measuring his corneo-retino potential per degree of arc through which his eyes swing. This standardization consists of the system of lights placed above the patient and which are individually controllable by separate switches. The lamps are mounted at such a distance above the patient's head and at such distances from each other that the patient's eyes in following the lights as they are flashed on and off according to a definite schedule sweep standard angles. Recordings are made of the differences in potential caused by the patient's eyes swinging through the prescribed arcs so as to form a basis for comparing the later readings during the nystagmus test.

After the temperature of the gaseous carbon dioxide has been brought to the proper level, the supply lines 86 are connected to the ear pieces simultaneously with the starting of the recording apparatus. The small conduits within the ear pieces cause a small jet of carbon dioxide at the control temperature to discharge directly against the ear drum and thus induce nystagmus, causing the eyeballs to oscillate, and such oscillations produce electrical impulses because of the changing potential between the electrodes.

The electrodes pick up the corneo-retino potential of the patient's temples or at the top and bottom of the patient's eye sockets. This potential is applied to an amplifier which magnifies it to a sufficiently high value to operate the recording oscillograph. The oscillograph then traces out, on a strip of paper, a graph in which the convolutions correspond to the horizontal components of the movement of the patient's eyes during nystagmus. Of course, either or both of the eye movements can be selectively recorded. In any event, the horizontal and vertical components of the nystagmus can be recorded separately or simultaneously. In the case of simultaneous recording, a definite characteristic figure can be obtained on the face of the oscilloscope when connected as shown.

Insofar as the patient is concerned, the patient is only placed upon the table, standardized, and then the stimulus is applied to his ear drum or ear drums at which time the pump and oscillograph are simultaneously started. As soon as nystagmus appears, the pump is stopped and the ear piece disconnected from the stimulus system. The nystagmus is recorded upon the oscillograph until it ceases, following which the patient is unharnessed and the examination is terminated. The graph can then be later analyzed for diagnostic purposes in a manner well known to those skilled in the art.

Of course, this process does not depend exclusively upon the use of Dry Ice, but rather requires only the existence of a temperature gradient between the tympanic membrane and the inner ear. This gradient may be either positive or negative; that is, the temperature of the gas may be such as to make the tympanic membrane warmer or colder than its surroundings, in either case nystagmus will be induced in the manner explained. Also, any type of inert non-toxic gas may be used for this purpose.

It will be recognized that only the particular process and apparatus used for inducing and recording nystagmus has been described in detail. The medical aspects of this invention have been specifically minimized since such are well known to those skilled in the art. The basis of this invention lies in the novel process and apparatus for inducing and recording nystagmus in all types of patients in accordance with a standardized and measurable manner that will produce exceptionally accurate clinical results for diagnostic and research purposes.

While this invention has been described with particular reference to the construction shown in the drawing, it is to be understood that such is not to be construed as imparting limitations upon the invention, which is best defined by the claims appended hereto.

Having thus described our invention, we claim as new and desire to secure by Letters Patent:

1. Apparatus for inducing and recording nystagmus in the human body, comprising in combination, temperature changing means for stimulating the horizontal and vertical channels of the balancing mechanism of a patient, positioning means for orientating the head of the patient to control the stimulation of the determined ones of the horizontal and vertical canals, electrical detection means for producing a signal in response to detection of the nystagmus developed in the patient, permanent recording means for recording said signals produced by said electrical detection means, said positioning means comprising a table for supporting the patient in a predetermined position relative to a substantially horizontal plane, said temperature changing means for stimulating the canals of the balancing mechanism of the patient comprising a conduit, an ear piece having a main body member receivable within the outer ear of the patient and having a bore extending therethrough for supporting said conduit adjacent to the eardrum of the patient, means for generating a fluid stream of low specific heat at a predetermined temperature, said conduit conducting said fluid stream from said generating means, said electrical detection means comprising a pair of electrodes, one such electrode being supported in electrical conducting relationship adjacent to each temple of the patient, each said electrode detecting a difference in potential between the opposite sides of the patient's head, an amplifier for increasing the strength of the signal developed between said electrodes, said permanent recording means comprising an oscillograph electrically connected to said amplifier, measuring means standardizing the signals for each patient comprising visual objects in predetermined spaced apart relationship extending in a direction laterally of the longitudinal axis of the patient's body, whereby the strength of the signal developed between said electrodes for the extent of eye travel for each patient may be indexed, said visual objects comprising spaced apart lamps, and switch control means for selectively energising individual ones of said lamps.

2. Apparatus as set forth in claim 1, wherein said generating means comprises a vessel, a quantity of Dry Ice enclosed within said vessel, an outlet communicating at one end with the interior of said vessel connected at the opposite end to said ear piece, and an inlet communicating with the interior of said vessel supplying a flow of pressurized air thereto for effecting sublimation of said Dry Ice.

3. Apparatus as set forth in claim 2, wherein said spaced apart lamps are mounted within a circular plate, and gear drive means selectively rotating said circular plate relative to said table.

4. Apparatus as set forth in claim 3, wherein said table comprises a flat top, a base, said flat top being pivotally supported upon said base, and hydraulic means selectively adjusting said flat top relative to said base.

References Cited in the file of this patent

UNITED STATES PATENTS

| | | |
|---|---|---|
| 2,539,189 | Garrett | Jan. 23, 1951 |
| 2,639,206 | Butler | May 19, 1953 |
| 2,860,627 | Harden et al. | Nov. 18, 1958 |